United States Patent
Jung (10) Patent No.: US 9,725,056 B2
(45) Date of Patent: Aug. 8, 2017

(54) APPARATUS FOR CONTROLLING DIRECT CURRENT TERMINAL VOLTAGE OF CONSTRUCTION MACHINERY EQUIPPED WITH MOTOR, AND METHOD FOR SAME

(71) Applicant: Doosan Infracore Co., Ltd., Incheon (KR)

(72) Inventor: Eun Soo Jung, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 202 days.

(21) Appl. No.: 14/762,860

(22) PCT Filed: Jan. 23, 2014

(86) PCT No.: PCT/KR2014/000655
§ 371 (c)(1),
(2) Date: Jul. 23, 2015

(87) PCT Pub. No.: WO2014/116036
PCT Pub. Date: Jul. 31, 2014

(65) Prior Publication Data
US 2015/0321630 A1    Nov. 12, 2015

(30) Foreign Application Priority Data

Jan. 24, 2013 (KR) .................. 10-2013-0007859

(51) Int. Cl.
*B60R 16/033* (2006.01)
*F02D 29/06* (2006.01)
(Continued)

(52) U.S. Cl.
CPC ............ *B60R 16/033* (2013.01); *E02F 9/123* (2013.01); *E02F 9/2075* (2013.01);
(Continued)

(58) Field of Classification Search
CPC ............ E02F 9/22; F02D 29/04; F02D 29/06
(Continued)

(56) References Cited

U.S. PATENT DOCUMENTS

| 6,098,322 A | 8/2000 | Tozawa et al. |
| 2005/0207897 A1 | 9/2005 | Kim |
| 2011/0313608 A1 | 12/2011 | Izumi et al. |

FOREIGN PATENT DOCUMENTS

| CN | 1211295 A | 3/1999 |
| CN | 1673916 A | 9/2005 |

(Continued)

OTHER PUBLICATIONS

Chinese Office Action dated Jun. 24, 2016 for Chinese Application No. 201480005598.1, 8 pages.

(Continued)

*Primary Examiner* — Robert Deberadinis
(74) *Attorney, Agent, or Firm* — John D. Veldhuis-Kroeze; Westman, Champlin & Koehler, P.A.

(57) ABSTRACT

An exemplary embodiment suggested in the present specification provides an apparatus and a method of controlling a voltage of a direct current terminal of construction machinery equipped with a motor, which are capable of improving energy efficiency of a power conversion apparatus, such as an inverter and a converter by changing a voltage of the direct current terminal to an optimum voltage size in consideration of operation conditions of a swing motor, an engine auxiliary motor, and an energy storage apparatus.

8 Claims, 6 Drawing Sheets

(51) Int. Cl.
*E02F 9/12* (2006.01)
*E02F 9/20* (2006.01)
*E02F 9/22* (2006.01)

(52) U.S. Cl.
CPC .......... *E02F 9/2091* (2013.01); *E02F 9/2095* (2013.01); *F02D 29/06* (2013.01)

(58) Field of Classification Search
USPC ....................................... 307/9.1, 18, 19, 20
See application file for complete search history.

(56) References Cited

FOREIGN PATENT DOCUMENTS

| | | |
|---|---|---|
| CN | 202000385 U | 10/2011 |
| CN | 102459769 A | 5/2012 |
| EP | 2441894 A1 | 4/2012 |
| JP | 2002-359935 A | 12/2002 |
| JP | 2003-328397 A | 11/2003 |
| JP | 2008-101345 A | 5/2008 |
| JP | 2009-191463 A | 8/2009 |
| KR | 10-2012-0024736 A | 3/2012 |

OTHER PUBLICATIONS

European Search Report dated Aug. 26, 2016 for European Application No. 14743817.0, 7 pages.
International Search Report with English translation from the Korean Intellectual Property Office mailed May 13, 2014 for corresponding International Application No. PCT/KR2014/000655 filed Jan. 23, 2014, 5 pages

APPARATUS FOR CONTROLLING DIRECT CURRENT TERMINAL VOLTAGE OF CONSTRUCTION MACHINERY EQUIPPED WITH MOTOR, AND METHOD FOR SAME

CROSS REFERENCE TO RELATED APPLICATION

This application is a Section 371 National Stage Application of International Application No. PCT/KR2014/000655, filed Jan. 23, 2014 and published, not in English, as WO 2014/116036 on Jul. 31, 2014.

FIELD OF THE DISCLOSURE

The present disclosure relates to an apparatus for controlling a voltage of a direct current terminal of construction machinery equipped with a motor, and a method thereof.

BACKGROUND OF THE DISCLOSURE

Recently, researches on hybrid type construction equipment, which improves fuel efficiency by storing surplus power of an engine in a battery, and supplying power from the battery to the engine that does not have sufficient power so as to cope with a rapid increase in oil price, are being actively conducted.

A system, which uses the engine and an electric motor as a common power source as described above, and has an electrical energy storage apparatus, is referred to as a hybrid system. For example, as the hybrid system, there is a hybrid system for heavy equipment such as a hybrid vehicle, and an excavator.

A general excavator system performs an operation of driving a boom, an arm, and a bucket, which are final loads, and swing or travelling by using an engine as a power source through a medium, that is, hydraulic pressure. On the contrary, in the case of a hybrid excavator system, two motors and an electricity storage apparatus are additionally installed in a general excavator, thereby improving overall efficiency of the excavator system. Main components added to the hybrid excavator system include a motor, an energy storage apparatus, an inverter, and a converter. Here, the energy storage apparatus includes a battery and an ultra-capacitor (UC).

In general, a direct current terminal voltage necessary for power conversion of the inverter and the converter in the hybrid excavator is varied by unbalance of an output of an engine auxiliary motor and an output of a swing motor. Accordingly, a converter for the energy storage apparatus is applied in order to constantly maintain a direct current terminal voltage.

In this case, a reference voltage for determining a charging/discharging operation of the converter, that is, an instruction voltage of the direct current terminal voltage control unit has a uniform value regardless of an operation of construction machinery. Further, the instruction voltage is set with a value large enough to encompass all of the speeds and torque regions at and in which the engine auxiliary motor and the swing motor are operable.

A method of controlling a direct current terminal voltage of the hybrid excavator will be described below. In general, an engine auxiliary inverter, an inverter for swinging, and a converter for an energy storage apparatus connected to the direct current terminal are formed of a semiconductor switch. Energy loss generated during the driving of the semiconductor switch is proportional to an output current, a switching frequency, and a direct current terminal voltage. A size of the output current is determined under a load condition. The switching frequency is mainly determined by inductance of an output terminal and a size of a current pulsatory motion. The direct current terminal voltage is mainly designed to be a maximum voltage capable of encompassing all of the speeds and the torque regions, at and in which the engine auxiliary motor and the swing motor are operable, within a voltage range allowed by the semiconductor switch.

As described above, when the engine auxiliary motor or the swing motor are driven at a low speed in the hybrid excavator, an excessively large direct current terminal voltage is maintained regardless of driving of the inverter, so that a voltage loss is unnecessarily is generated. Particularly, there is a large problem in a voltage loss in a low speed and high torque region.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

The present disclosure is conceived so as to solve the problems in the related art, and an object of the present disclosure is to provide an apparatus for controlling a voltage of a direct current terminal of construction machinery equipped with a motor, which is capable of improving energy efficiency of a power converting apparatus, such as an inverter and a converter, by controllably changing a voltage of a direct current terminal in consideration of operation conditions of a swing motor, an engine auxiliary motor, and an energy storage apparatus, and a method thereof.

In order to achieve the aforementioned object, an exemplary embodiment suggested in the present specification provides an apparatus for controlling a voltage of a direct current terminal of construction machinery equipped with a motor, the apparatus including: one or more inverters connected to one or more motors which convert electric energy into mechanical energy or regenerate mechanical energy to electric energy, respectively, to control the one or more motors; a converter connected to an energy storage apparatus storing regenerative power generated by the one or more motors to control the energy storage apparatus; a direct current terminal capacitor connected between the one or more inverters and the converter, and configured to receive power through the one or more inverters or collect the regenerated power through the converter; and a control unit configured to generate one or more inverter demanded voltages demanded by the one or more inverters and a converter demanded voltage demanded by the converter, and variably control a direct current terminal voltage of the direct current terminal capacitor based on the one or more generated inverter demanded voltages and the generated converter demanded voltage.

In the meantime, another exemplary embodiment suggested in the present specification provides a method of controlling a voltage of a direct current terminal of construction machinery equipped with a motor, the method including: generating one or more inverter demanded voltages demanded by one or more inverters connected to one or more motors, respectively; generating a converter demanded voltage demanded by a converter connected to an energy storage apparatus; and variably controlling a direct current terminal voltage of a direct current terminal capacitor, which receives power through the one or more inverters or collects regenerated power through the converter, based on the one or more generated inverter demanded voltages and the generated converter demanded voltage.

According to the exemplary embodiments suggested in the present specification, it is possible to improve energy efficiency of the power conversion apparatus and decrease power loss by variably controlling a direct current terminal voltage.

Further, according to the exemplary embodiments suggested in the present specification, it is possible to improve efficiency of the entire system, as well as efficiency of the power conversion apparatus, by decreasing power used by a cooling system due to a decrease in power loss.

Further, according to the exemplary embodiments suggested in the present specification, the present disclosure is not limited only to hybrid construction machinery, and is applicable to an electric excavator equipped with an energy storage apparatus and a swing motor. In this case, the present disclosure may be applied by removing only a role of the engine auxiliary motor described above. Here, for electric construction machinery, an electric travel motor is applicable instead of a swing motor.

DETAILED DESCRIPTION

It should be noted that technical terms used in the present specification are used only to describe a specific exemplary embodiment, and do not intend to limit the present disclosure. Further, technical terms used in the present specification shall be construed as a meaning generally understood by those skilled in the art unless they are specially defined as other meanings in the present specification, and shall not be construed in excessively general or narrow meanings. Further, when technical terms used in the present specification are improper technical terms, which fail to correctly express the spirit of the present disclosure, the technical terms shall be substituted with technical terms, which those skilled in the art may properly understand, to be understood. Further, a general term used in the present disclosure shall be construed according to a meaning defined in a dictionary or the context of a related description, and shall not be construed to have an excessively narrow meaning.

Further, the singular forms used in the present specification include the plural forms, unless the context clearly indicates otherwise. In the present application, a term, "comprise" or "include" shall not be construed as essentially including several constituent elements or several steps described in the specification, and it shall be construed that some constituent elements or some steps may not be included, or additional constituent elements or steps may be further included.

Further, suffixes, "module" and "unit", for components used in the present specification are given or mixed and used by considering easiness in preparing a specification and do not have a meaning or role distinguished from each other in themselves.

Terms including ordinal numbers, such as "first" and "second", used in the present specification may be used for describing various constituent elements, but the constituent elements should not be limited by the terms. The above terminologies are used only to discriminate one constituent element from another constituent element. For example, without departing a scope of the present disclosure, a first component may be referred to as a second component and similarly, a second component may also be referred to as a first component.

Hereinafter, an exemplary embodiment of the present disclosure will be described in detail with reference to the accompanying drawings, in which like reference numerals refer to like or similar constituent elements regardless of reference numerals and a duplicated description thereof will be omitted.

In describing the present disclosure, when it is determined that the detailed description of the known art related to the present disclosure may obscure the gist of the present disclosure, the detailed description thereof will be omitted. Further, it is noted that the accompanying drawings are used just for easily appreciating the spirit of the present disclosure and it should not be analyzed that the spirit of the present disclosure is limited by the accompanying drawings.

Figure 1:
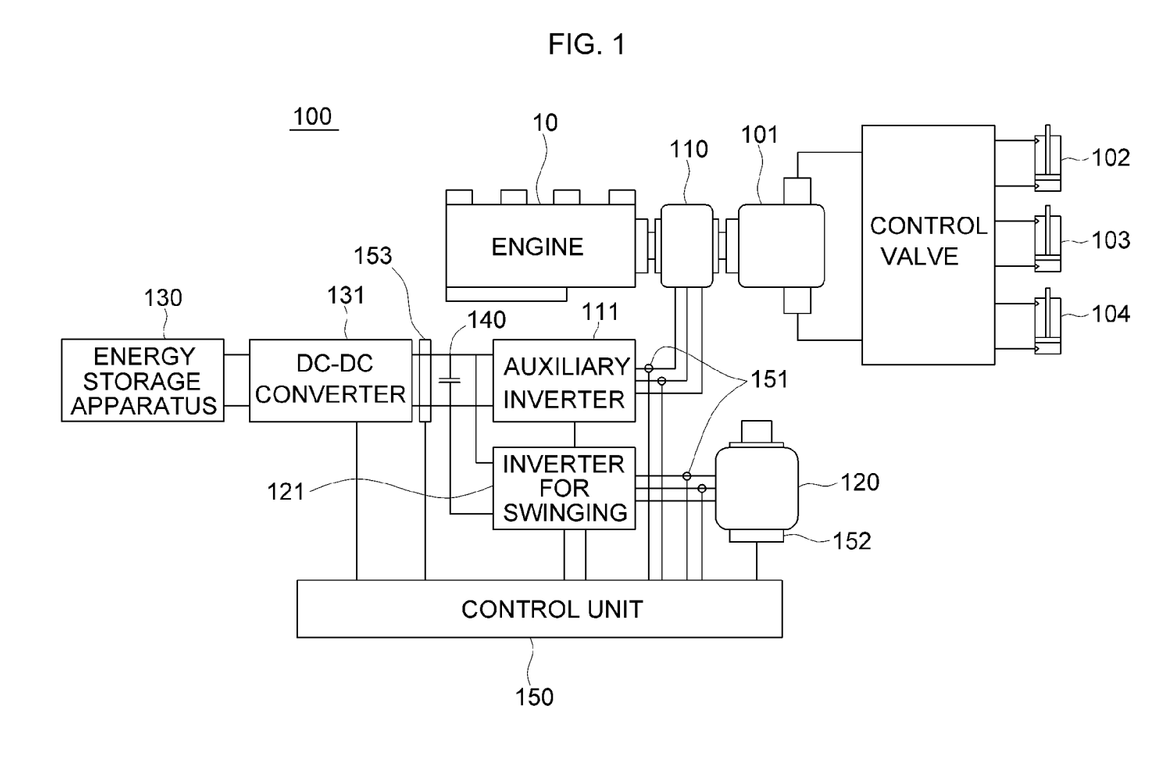
FIG. 1 is a configuration diagram of hybrid construction machinery including a direct current terminal voltage controlling apparatus according to an exemplary embodiment of the present disclosure.

FIG. 1 is a configuration diagram of hybrid construction machinery including a direct current terminal voltage controlling apparatus according to an exemplary embodiment of the present disclosure.

As illustrated in FIG. 1, hybrid construction machinery 100 includes a hydraulic pump 101, a boom cylinder 102, an arm cylinder 103, a bucket cylinder 104, an engine 10, an engine auxiliary motor 110, an auxiliary inverter 111, a swing motor 120, an inverter 121 for swinging, an energy storage apparatus 130, a DC-DC converter 131, a direct current terminal capacitor 140, and a control unit 150.

The construction machinery (for example, an excavator and a wheel loader) equipped with the electric swing motor 120 may be generally divided into the hybrid construction machinery 100 and electric construction machinery (FIG. 2) according to whether the engine 10 that is a main power source exists. For convenience of the description of the present disclosure, the hybrid construction machinery 100 is mainly described, and then the electric construction machinery will be described with reference to FIG. 2.

FIG. 1 is a configuration diagram of the hybrid construction machinery 100.

The illustrated engine auxiliary motor 110 is directly connected to the engine 10.

The hydraulic pump 101 directly connected to the engine auxiliary motor 110 is connected to a control valve controlling pressurized oil of the hydraulic pump 101. The boom cylinder 102, the arm cylinder 103, and the bucket cylinder 104 driving a boom, an arm, and a bucket are driven through the pressurized oil transmitted from the control valve.

The engine auxiliary motor 110 directly connected with the engine 10 is operated as a motor when an output of the engine 10 is insufficient, and is operated as a power generator when an output of the engine 10 has a room.

The auxiliary inverter 111 controls the engine auxiliary motor 110 in order to operate the engine auxiliary motor 110 as a motor or a power generator, and drives the engine auxiliary motor 110 according to an instruction of the control unit 150.

The direct current terminal capacitor 140 is connected to an input terminal of the auxiliary inverter 111. The direct current terminal capacitor 140 stabilizes an input voltage of the auxiliary inverter 111, and serves to temporarily store generated energy when the engine auxiliary motor 110 is operated as a power generator.

The swing motor 120 rotates an upper swing body of the hybrid construction machinery 100 (for example, and excavator and the like). The inverter 121 for swinging drives the swing motor 120, and is connected to the direct current terminal capacitor 140.

The inverter 121 for swinging, which drives the swing motor 120, performs an acceleration operation or a deceleration operation according to a lever instruction of the hybrid construction machinery 100. The inverter 121 for swinging converts rotary inertia energy of the upper swing body of the hybrid construction machinery 100 into electric energy by operating the swing motor 120 as a motor during the acceleration and as a power generator during the deceleration, and supplies the electric energy to the direct current terminal capacitor 140.

The energy storage apparatus 130 stores regenerated energy. The energy storage apparatus 130 is connected to the DC-DC converter 131 controlling charging and discharging of the energy storage apparatus 130.

The control unit 150 determines an output quantity when the engine auxiliary motor 110 is operated as a motor and an output quantity when the engine auxiliary motor 110 is operated as a power generator by controlling a flow of power of the entire hybrid construction machinery 100, and controls an energy quantity stored in the energy storage apparatus 130.

In the meantime, the engine 10 provides power necessary for operating the hybrid construction machinery 100 to the hydraulic pump 101. When a load of the hybrid construction machinery 100 is smaller than an output of the engine 10, the engine auxiliary motor 110 directly connected to the engine 10 is operated as a power generator. Further, surplus energy of the engine 10 is supplied to the direct current terminal capacitor 140 through the auxiliary inverter 111. In this case, in the related art, the DC-DC converter 131 controlling the energy storage apparatus 130 detects a voltage of the direct current terminal, and when the voltage of the direct current terminal is increased, the DC-DC converter 131 stores energy of the direct current terminal in the energy storage apparatus 130 and controls a voltage of the direct current terminal to be uniform.

By contrast, when the output of the engine 10 is smaller than a load of the hybrid construction machinery 100, the engine auxiliary motor 110 is operated as a motor, and uses energy stored in the direct current terminal. Accordingly, when the voltage of the direct current terminal is decreased, the DC-DC converter 131 controlling the energy storage apparatus 130 supplies the energy stored in the energy storage apparatus 130 to the direct current terminal capacitor 140 and controls the voltage of the direct current terminal capacitor 140 to be uniform in the related art.

The swing motor 120 rotates the upper swing body according to the lever instruction driving the upper swing body of the hybrid construction machinery 100. The swing motor 120 accelerates the motor by using the energy stored in the direct current terminal capacitor 140 during the acceleration. In the related art, the voltage of the direct current terminal capacitor 140 is decreased by the energy used by the swing motor 120, and the DC-DC converter 131 supplies the used energy at the time of the acceleration of the swing motor 120 to the direct current terminal and controls the voltage of the direct current terminal to be uniform.

When the upper swing body of the hybrid construction machinery 100 is decelerated, the swing motor 120 is operated as a power generator to generate a brake torque, and when the generated energy is supplied to the direct current terminal capacitor 140, the voltage of the direct current terminal capacitor 140 is increased. In the related art, the DC-DC converter 131 stores the increased energy in the energy storage apparatus 130 and controls the voltage of the direct current terminal to be uniform.

As described above, a voltage of the direct current terminal is controlled to be uniform in the related art, but the direct current terminal voltage controlling apparatus according to the exemplary embodiment of the present disclosure changes a voltage of the direct current terminal in consideration of the operation conditions of the engine auxiliary motor 110, the swing motor 120, and the energy storage apparatus 130, thereby improving energy efficiency of the power conversion apparatus, such as the auxiliary inverter 111, the inverter 121 for swinging, and the DC-DC converter 131.

To this end, the direct current terminal voltage controlling apparatus according to the exemplary embodiment of the present disclosure includes one or more inverters (the auxiliary inverter 111 and the inverter for swinging 121 in FIG. 1), the converter for controlling the energy storage apparatus 130 (the DC-DC converter 131 in FIG. 1), the direct current terminal capacitor 140, and the control unit 150, each of which is connected to one or more motors (the engine auxiliary motor 110 and the swing motor 120 in FIG. 1). The control unit 150 is connected with a current detector 151, a position detector 152, and a voltage detector 153. All of the aforementioned constituent elements are not essentially required, and may be partially omitted.

Hereinafter, each of the constituent elements of the direct current terminal voltage controlling apparatus according to the exemplary embodiment of the present disclosure will be described with reference to FIG. 1.

The auxiliary inverter 111 and the inverter 121 for swinging are connected to the auxiliary motor 110 and the swing motor 120, which converts electric energy to mechanical energy or regenerate mechanical energy to electric energy, respectively, to control the auxiliary motor 110 and the swing motor 120.

The DC-DC converter 131 is connected to the energy storage apparatus 130 storing regenerative power generated by at least one motor to control the energy storage apparatus 130.

The direct current terminal capacitor 140 is connected between the auxiliary inverter 111, the inverter 121 for swinging, and the DC-DC converter 131, and receives power through the auxiliary inverter 111 and the inverter 121 for swinging or collects power regenerated through the DC-DC converter 131.

The control unit 150 generates one or more inverter demanded voltages demanded by each of the auxiliary inverter 111 and the inverter 121 for swinging and a converter demanded voltage demanded by the DC-DC converter 131. In this case, the control unit 150 generates each inverter demanded voltage by using at least one of a motor speed, an output current, and an inverter output voltage instruction corresponding to each inverter. Further, the control unit 150 generates a converter demanded voltage by using a voltage of an energy storage apparatus corresponding to the DC-DC converter 131 or a converter output voltage instruction.

Further, the control unit 150 variably controls the voltage of the direct current terminal of the direct current terminal capacitor 140 based on the one or more generated inverter demanded voltages and the generated converter demanded voltage. The control unit 150 may calculate a maximum demanded voltage among the one or more generated inverter demanded voltages and the generated converter demanded voltage, and variably control the voltage of the direct current terminal of the direct current terminal capacitor 140 according to the calculated maximum demanded voltage. Further, the control unit 150 may add a predetermined voltage margin to the calculated maximum demanded voltage, and variably control the voltage of the direct current terminal of the direct current terminal capacitor 140 according to the maximum demanded voltage to which the predetermined voltage margin is added.

Figure 2:
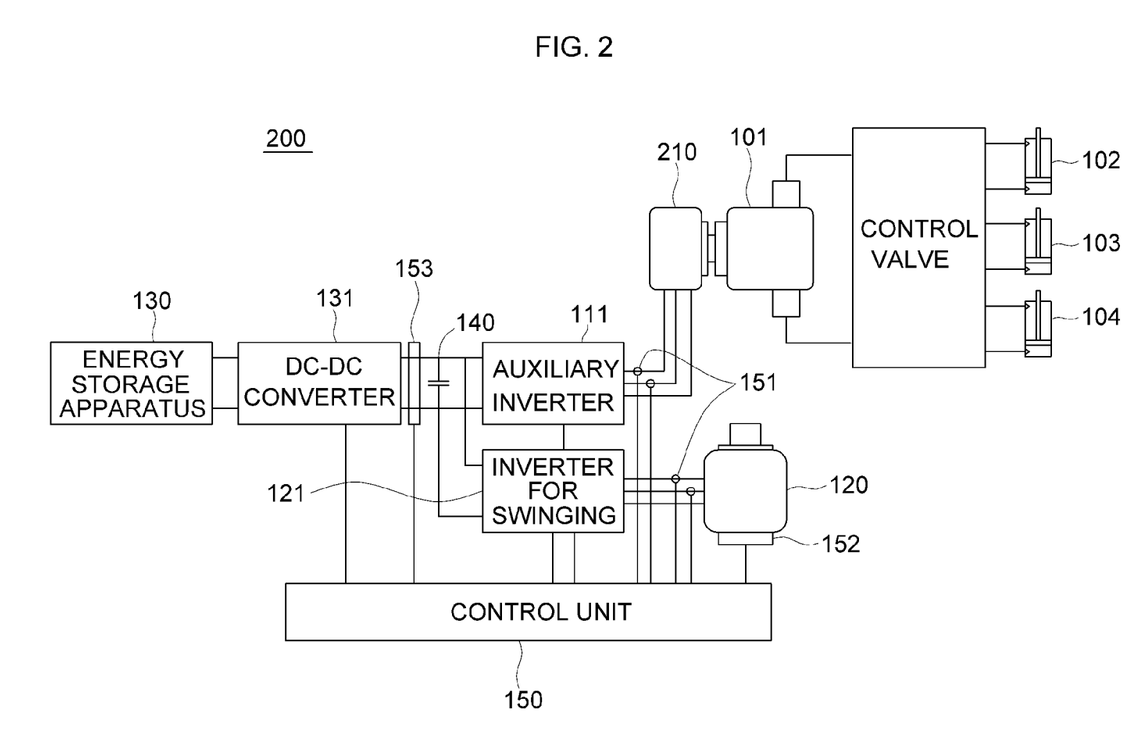
FIG. 2 is a configuration diagram of electric construction machinery including the direct current terminal voltage controlling apparatus according to the exemplary embodiment of the present disclosure.

FIG. 2 is a configuration diagram of electric construction machinery including the direct current terminal voltage controlling apparatus according to the exemplary embodiment of the present disclosure.

As illustrated in FIG. 2, electric construction machinery 200 is not equipped with the engine 10 unlike the hybrid excavator 110 of FIG. 1, and includes a hydraulic pump motor 210 driving a hydraulic pump 101 and an auxiliary inverter 211.

The exemplary embodiment of the present disclosure is not limited to the hybrid excavator 101 of FIG. 1, and is applicable to the electric excavator 200 including the energy storage apparatus 140 and the swing motor 120. Further, the exemplary embodiment of the present disclosure is applicable even to an electric loader adopting an electric travelling motor, instead of a swing motor.

Figure 3:
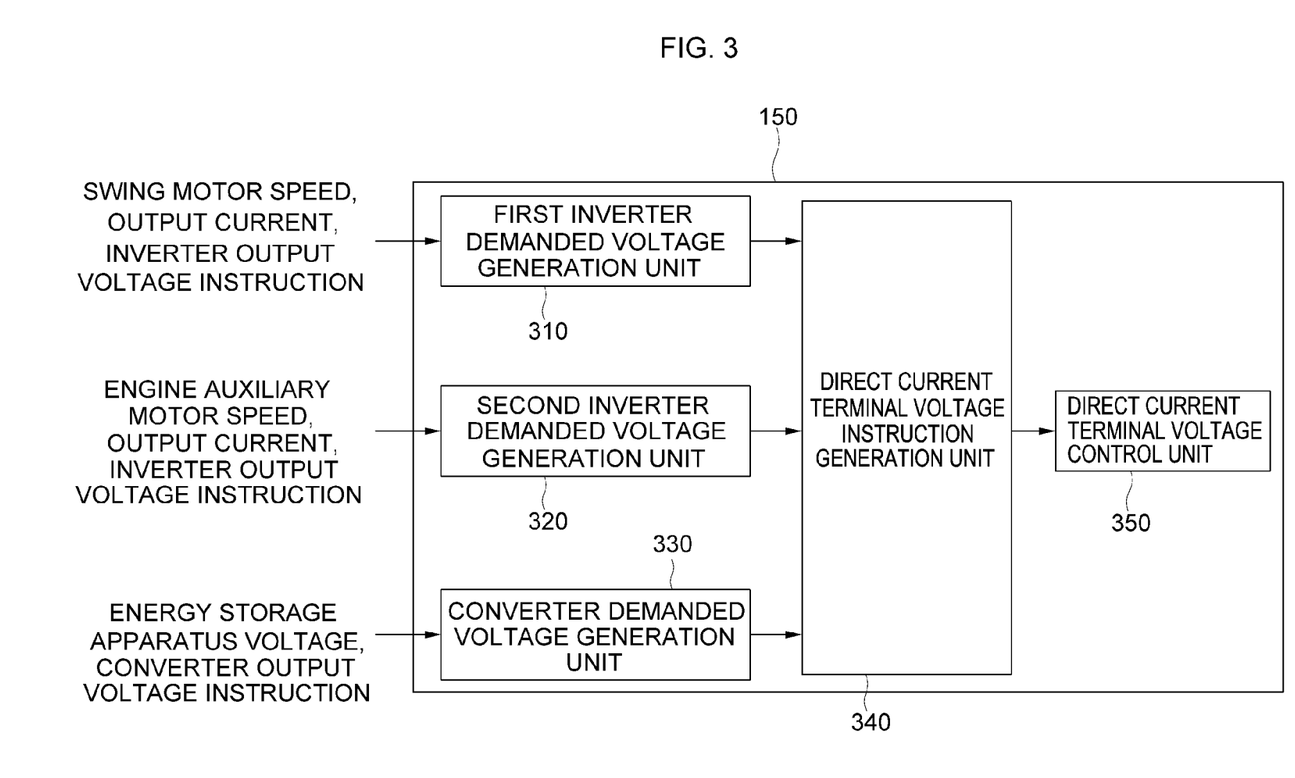
FIG. 3 is a detailed configuration diagram of a control unit of the direct current terminal voltage controlling apparatus according to the exemplary embodiment of the present disclosure.

FIG. 3 is a detailed configuration diagram of the control unit of the direct current terminal voltage controlling apparatus according to the exemplary embodiment of the present disclosure.

As illustrated in FIG. 3, the control unit 150 includes a first inverter demanded voltage generation unit 310, a second inverter demanded voltage generation unit 320, a converter demanded voltage generation unit 330, a direct current terminal voltage instruction generation unit 340, and a direct current terminal voltage control unit 350.

The first inverter demanded voltage generation unit 310 receives a speed, an output, current, and an inverter output voltage instruction of the swing motor 120 and generates a first inverter demanded voltage.

The second inverter demanded voltage generation unit 320 receives a speed, an output, current, and an inverter output voltage instruction of the engine auxiliary motor 110 and generates a second inverter demanded voltage.

The converter demanded voltage generation unit 330 receives a voltage and a converter output voltage instruction of the energy storage apparatus 130 and generates a converter demanded voltage.

The direct current terminal voltage instruction generation unit 340 calculates a maximum demanded voltage among the first inverter demanded voltage, the second inverter demanded voltage, and the converter demanded voltage generated by each of the first inverter demanded voltage generation unit 310, the second inverter demanded voltage generation unit 320, the converter demanded voltage generation unit 330, respectively, and generates a direct current terminal voltage instruction according to the calculated maximum demanded voltage.

The direct current terminal voltage control unit 350 variably controls the voltage of the direct current terminal of the direct current terminal capacitor 140 according to the generated direct current terminal voltage instruction.

Particularly, when Equation 1 below is satisfied, the auxiliary inverter 111 and the inverter 121 for swinging may be normally operated. Accordingly, a size of a minimum direct current terminal voltage demanded by the auxiliary inverter 111 and the inverter 121 for swinging may be calculated by phase voltage instructions of the auxiliary inverter 111 and the inverter 121 for swinging.

$$V_{dc} \geq V_{inv} = \sqrt{3} V_{phase} \quad \text{[Equation 1]},$$

Here, $V_{dc}$ and $V_{inv}$ represent a size of a voltage of the direct current terminal and a size of a minimum voltage demanded by each inverter, respectively. Here, a phase voltage $V_{phase}$ represents a peak value of a phase voltage in a normal state, and is determined based on a speed and an output current of each motor. The relation may be expressed by a phasor as represented by Equation 2 below.

$$V_{phase} = j\omega L I_{phase} + R I_{phase} + E \quad \text{[Equation 2]},$$

Here, $V_{phase}$, $I_{phase}$, and E represent a phase voltage expressed by a phasor, a phase current, and counter-electromotive force, respectively. ω, L, and R represent a motor speed, phase inductance, and phase resistance, respectively.

Further, a size of counter-electromotive force is proportional to a size of a magnetic field flux and a rotary speed as represented by Equation 3 below.

$$E = \omega \lambda_f \quad \text{[Equation 3]},$$

Here, $\lambda_f$ represents a size of a magnetic field flux.

As described above, the direct current terminal voltage instruction generating unit 340 collects the direct current terminal voltages demanded by the inverter and the converter, and generates the largest value among the direct current terminal voltages as a direct current terminal voltage instruction of the direct current terminal voltage control unit 350 as represented by Equation 4.

$$V_{dc} = a \cdot \max(V_{inv1}, V_{inv2}, V_{conv}) \quad \text{[Equation 4]},$$

Here, a represents a margin in consideration of elements which are difficult to be expressed with numerical values within the power conversion apparatus. For example, the margin may generally be about 10 to 20%, and control the voltage of the direct current terminal like the example illustrated in FIG. 6.

Figure 4:
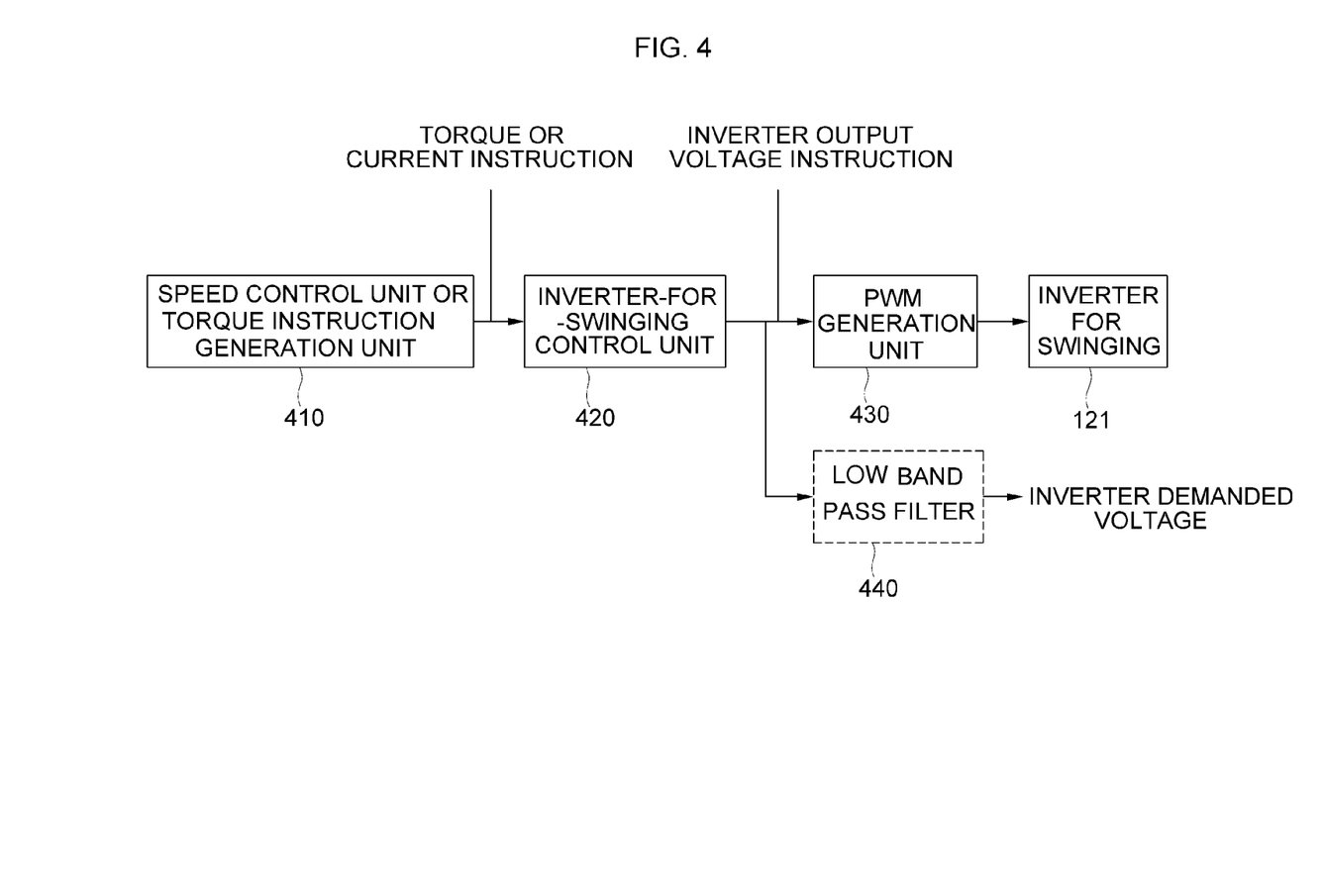
FIG. 4 is a block diagram illustrating generation of an inverter demanded voltage by the direct current terminal voltage controlling apparatus according to the exemplary embodiment of the present disclosure.

FIG. 4 is a block diagram illustrating generation of an inverter demanded voltage by the direct current terminal voltage controlling apparatus according to the exemplary embodiment of the present disclosure.

FIG. 4 represents a process of generating an inverter demanded voltage by using an inverter output voltage instruction through a block diagram.

A speed control unit or a torque instruction generation unit 410 generates a torque or a current instruction.

Further, an inverter-for-swinging control unit 420 generates an inverter output voltage instruction by using the generated torque or current instruction.

Next, a pulse width modulation (PWM) generation unit 430 controls the inverter 121 for swinging according to the generated inverter output voltage instruction.

When the voltage demanded by the inverter is generated based on Equation 2, and a pulsatory motion of a current size exists during the actual driving of the motor, there occurs a problem in that the direct current terminal voltage instruction is frequently varied. In this case, an influence of the pulsatory motion of the current may be decreased by filtering and calculating the current or generating the demanded voltage by using a current instruction.

Another method of calculating the voltage demanded by each inverter is a method of directly using, by the control unit 150, the inverter output voltage instruction of the inverter-for-swinging control unit 420 in advance. In this case, a difference between the result of Equation 2 generated by an error of a parameter, such as phase resistance, phase inductance, and counter-electromotive constant, of the motor and the actually demanded voltage may be decreased.

In order to decrease a difference between the result of Equation 2 and the actually demanded voltage, a low band pass filter 440 illustrated in FIG. 4 may low band pass filter the inverter output voltage instruction, and generate an inverter demanded voltage when the pulsatory motion of the inverter output voltage is a problem.

Figure 5:
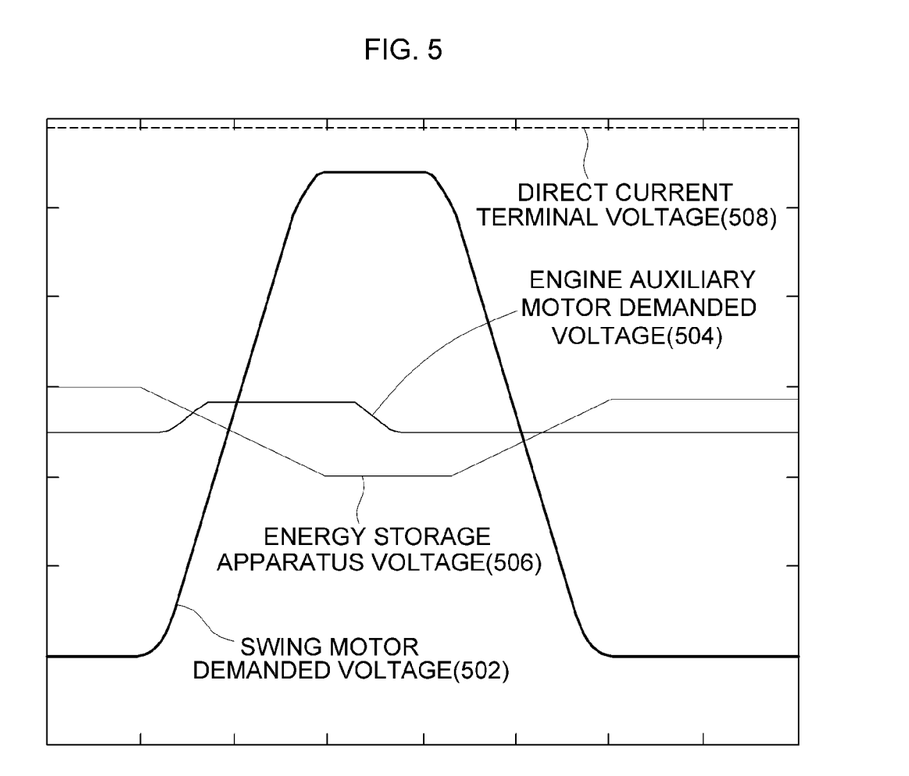
FIG. 5 is an explanation diagram for a fixed direct current terminal voltage control method in the related art.
Figure 6:
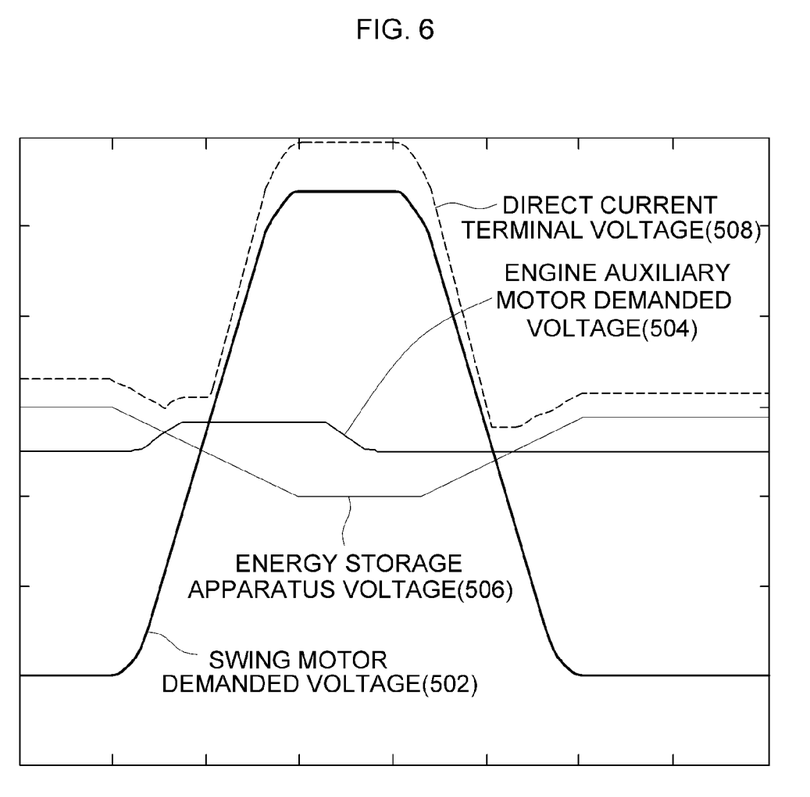
FIG. 6 is an explanation diagram for a variable direct current terminal voltage control method according to an exemplary embodiment of the present disclosure.

FIG. 5 is an explanation diagram for a fixed direct current terminal voltage control method in the related art, and FIG. 6 is an explanation diagram for a variable direct current terminal voltage control method according to an exemplary embodiment of the present disclosure.

As illustrated in FIG. 5, a fixed direct current terminal voltage control method in the related art fixedly controls a direct current terminal voltage 508 regardless of a swing motor demanded voltage 502, an engine auxiliary motor demanded voltage 504, and an energy storage apparatus voltage 506. In this case, the excessively large direct current terminal voltage 508 is maintained, so that a voltage loss is unnecessarily generated.

By contrast, as illustrated in FIG. 6, a variable direct current terminal voltage control method according to an exemplary embodiment of the present disclosure appropriately changes a direct current terminal voltage 508 according to a maximum demanded voltage among a swing motor demanded voltage 502, an engine auxiliary motor demanded voltage 504, and an energy storage apparatus voltage 506 in consideration of the swing motor demanded voltage 502, the engine auxiliary motor demanded voltage 504, and the energy storage apparatus voltage 506, thereby improving energy efficiency of the power conversion apparatus, such as the inverter and the converter.

The aforementioned method may be implemented by various means. For example, the exemplary embodiments of the present disclosure will be implemented by hardware, firmware, software, or a combination thereof.

When the exemplary embodiments of the present disclosure are implemented by hardware, the method according to the exemplary embodiments of the present disclosure may be implemented in one or more application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

When the exemplary embodiments of the present disclosure are implemented by firmware or software, the method according to the exemplary embodiments of the present disclosure may be implemented by a form of a module, a procedure, a function, and the like performing the aforementioned functions or operations. A software code may be stored in a memory unit and driven by a processor. The memory unit may be positioned inside or outside the processor to transceive data with the processor by already publicly known various means.

The exemplary embodiments disclosed in the present specification have been described with reference to the accompanying drawings. As described above, the exemplary embodiments illustrated in the respective drawings shall not be limitedly construed, and it may be construed that the exemplary embodiments may be combined by those skilled in the art fully understanding the contents of the present specification, and when the exemplary embodiments are combined, some constituent elements may be omitted.

Here, the terms or words used in the present specification and the claims should not be construed as being limited as a commonly used or lexical meaning, and should be construed as a meaning and a concept to conform to the technical spirit disclosed in the present specification.

Therefore, the embodiments disclosed in the specification and the configurations illustrated in the drawings are just exemplary embodiments disclosed in the present specification and do not fully represent the technical spirit disclosed in the present specification, so that, it should be appreciated that there are various equivalents and modified examples capable of substituting them at the filing date of the present application.

| Description of Main Reference Numerals of the Drawings | |
| --- | --- |
| 10: Engine | 101: Hydraulic pump |
| 102: Boom cylinder | 103: Arm cylinder |
| 104: Bucket cylinder | 110: Engine auxiliary motor |
| 111: Auxiliary inverter | 120: Swing motor |
| 121: Inverter for swinging | 130: Energy storage apparatus |
| 131: DC-DC converter | 140: Direct current terminal capacitor |
| 150: Control unit | 151: Current detector |
| 152: Position detector | 153: Voltage detector |

The invention claimed is:

1. An apparatus for controlling a voltage of a direct current terminal of construction machinery equipped with a motor, the apparatus comprising:

one or more inverters connected to one or more motors which convert electric energy into mechanical energy or regenerate mechanical energy to electric energy, respectively, to control the one or more motors;

a converter connected to an energy storage apparatus storing regenerative power generated by the one or more motors to control the energy storage apparatus;

a direct current terminal capacitor connected between the one or more inverters and the converter, and configured to receive power through the one or more inverters and collect the regenerated power through the converter; and a control unit configured to generate one or more inverter demanded voltages demanded by the one or more inverters and a converter demanded voltage demanded by the converter, and variably control a direct current terminal voltage of the direct current terminal capacitor based on the one or more generated inverter demanded voltages and the generated converter demanded voltage; and wherein the control unit calculates a maximum demanded voltage among the one or more generated inverter demanded voltages and the converter demanded voltage, and variably controls the direct current terminal voltage of the direct current terminal capacitor according to the calculated maximum demanded voltage.

2. The apparatus of claim 1, wherein the control unit generates each inverter demanded voltage by using at least one of a motor speed, an output current, and an inverter output voltage instruction corresponding to each inverter, and generates a converter demanded voltage by using a voltage of an energy storage apparatus corresponding to the converter or a converter output voltage instruction.

3. The apparatus of claim 1, wherein the control unit further includes a low band pass filter, and in order to decrease a pulsatory motion generated during driving of the one or more motors, the control unit low band pass filters the output current through the included low band pass filter to generate an inverter demanded voltage.

4. The apparatus of claim 1, wherein the control unit adds a predetermined voltage margin to the calculated maximum demanded voltage, and variably controls the direct current terminal voltage of the direct current terminal capacitor according to the maximum demanded voltage to which the predetermined voltage margin is added.

5. The apparatus of claim 1, wherein the one or more motors include at least one of a swing motor, an engine auxiliary motor, and a travel motor of hybrid construction machinery or electric construction machinery.

6. A method of controlling a voltage of a direct current terminal of construction machinery equipped with a motor, the method comprising:

generating one or more inverter demanded voltages demanded by one or more inverters connected to one or more motors, respectively;

generating a converter demanded voltage demanded by a converter connected to an energy storage apparatus; and variably controlling a direct current terminal voltage of a direct current terminal capacitor, which receives power through the one or more inverters or collects regenerated power through the converter, based on the one or more generated inverter demanded voltages and the generated converter demanded voltage; and wherein the variably controlling of the direct current terminal voltage includes calculating a maximum demanded voltage among the one or more generated inverter demanded voltages and the converter demanded voltage, and variably controlling the direct current terminal voltage of the direct current terminal capacitor according to the calculated maximum demanded voltage.

7. The method of claim 6, wherein the generating of the one or more inverter demanded voltages includes generating each inverter demanded voltage by using at least one of a motor speed, an output current, and an inverter output voltage instruction corresponding to each inverter, and the generating of the converter demanded voltage includes generating a converter demanded voltage by using an energy storage apparatus voltage corresponding to the converter or a converter output voltage instruction.

8. The method of claim 6, wherein the generating of the one or more inverter demanded voltages includes low band pass filtering the output current and generating an inverter demanded voltage in order to decrease a pulsatory motion generated during driving of the one or more motors.

* * * * *